US008892314B2

United States Patent
Charnesky et al.

(10) Patent No.: US 8,892,314 B2
(45) Date of Patent: Nov. 18, 2014

(54) REJECTION OF UNDER-HOOD AIRFLOW

(75) Inventors: Scott P. Charnesky, Birmingham, MI (US); Gregory J. Fadler, Commerce Township, MI (US); Thomas K. Lockwood, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 507 days.

(21) Appl. No.: 13/160,597

(22) Filed: Jun. 15, 2011

(65) Prior Publication Data

US 2012/0323448 A1 Dec. 20, 2012

(51) Int. Cl.
*B60K 11/04* (2006.01)
*F01P 7/10* (2006.01)
*B60K 11/08* (2006.01)
*F01P 7/04* (2006.01)

(52) U.S. Cl.
CPC .................. *F01P 7/10* (2013.01); *B60K 11/085* (2013.01); *F01P 7/04* (2013.01); *F01P 2025/32* (2013.01); *F01P 2025/60* (2013.01)
USPC ............................ 701/49; 180/68.1; 180/68.2

(58) Field of Classification Search
USPC ................ 701/49; 180/68.1, 68.2, 68.3, 68.4; 165/42, 43, 44
See application file for complete search history.

(56) References Cited

U.S. PATENT DOCUMENTS

| 5,269,264 | A | 12/1993 | Weinhold | |
|---|---|---|---|---|
| 7,055,638 | B2 * | 6/2006 | Khalighi et al. | 180/116 |
| 7,290,630 | B2 * | 11/2007 | Maeda et al. | 180/68.4 |
| 2003/0042055 | A1 | 3/2003 | Suwa et al. | |
| 2006/0102399 | A1 * | 5/2006 | Guilfoyle et al. | 180/68.1 |
| 2010/0083917 | A1 | 4/2010 | Saida et al. | |
| 2011/0097984 | A1 | 4/2011 | Hasegawa | |

FOREIGN PATENT DOCUMENTS

| DE | 10331937 A1 | 2/2005 |
|---|---|---|
| GB | 2131150 A | 6/1984 |

* cited by examiner

*Primary Examiner* — Khoi Tran
*Assistant Examiner* — Adam Mott
(74) *Attorney, Agent, or Firm* — Quinn Law Group, PLLC

(57) ABSTRACT

A system for controlling airflow through an under-hood compartment of a vehicle includes a first grille opening and a second grille opening each disposed at an entrance to the under-hood compartment. The first and second grille openings are configured to admit a first portion of the airflow and a second portion of the airflow, respectively, to the under-hood compartment from the ambient. The system also includes a selectable position shutter assembly disposed at the second grille opening and configured to control the second portion of the airflow admitted to the under-hood compartment. The system additionally includes a vent opening at least partially defined by the body and configured to exhaust at least a fraction of the first portion of the airflow from the under-hood compartment to the ambient. A vehicle employing the system and housing an internal combustion engine and a heat exchanger in the under-hood compartment is also disclosed.

16 Claims, 3 Drawing Sheets

REJECTION OF UNDER-HOOD AIRFLOW

TECHNICAL FIELD

The invention relates to rejection of airflow from an under-hood compartment of a motor vehicle.

BACKGROUND

Among various other uses, motor vehicles frequently employ ambient airflow for cooling powertrain components situated in an under-hood compartment. Ambient airflow typically enters the under-hood compartment through a grille opening strategically positioned in a high pressure area on the vehicle body.

Such a motor vehicle may also employ an adjustable shutter to control the amount of ambient airflow thus entering the under-hood compartment. The adjustable shutter may therefore be used to tailor the amount of airflow entering the under-hood compartment to the cooling requirements of a particular powertrain.

SUMMARY

A system for controlling airflow through an under-hood compartment of a vehicle includes a first grille opening and a second grille opening each disposed at an entrance to the under-hood compartment. The first and second grille openings are configured to admit a first portion of airflow and a second portion of airflow, respectively, to the under-hood compartment from the ambient. The system also includes a selectable position shutter assembly disposed at the second grille opening and configured to control the second portion of airflow admitted to the under-hood compartment. The system additionally includes a vent opening at least partially defined by the body and configured to exhaust at least a portion of the first portion of airflow from the under-hood compartment to the ambient.

The under-hood compartment may house an internal combustion engine and a heat exchanger. In such a case, the engine may be cooled by a fluid circulating through the heat exchanger and at least one of the first and second portions of the airflow may be passed through the heat exchanger to cool the fluid after the fluid is passed through the engine.

The system may also include a partition configured to maintain the first portion of the airflow separate from the second portion of the airflow. Each of the first and second portions of the airflow may be passed through the heat exchanger and the first portion of the airflow may be directed to the vent opening after being passed through the heat exchanger.

The internal combustion engine may generate a first predetermined amount of heat during base engine operation and up to a second predetermined amount of heat during increased stress engine operation. The first grille opening may be configured to provide sufficient cooling to the engine during the base engine operation and the second grille opening together with the first grille opening may be configured to provide sufficient cooling to the engine during increased stress engine operation.

The shutter assembly may include a mechanism configured to select the position of the shutter assembly between and inclusive of fully opened and fully closed. The shutter assembly may include at least one louver and the mechanism may be configured to rotate the at least one louver to selectively cover and uncover the vent opening.

The system may additionally include a controller configured to regulate the mechanism. The controller may be configured to regulate the mechanism according to a load on the engine.

The engine may be cooled by a fluid circulated through a heat exchanger. Additionally, the engine may include a sensor configured to detect a temperature of the fluid and communicate the temperature to the controller.

Furthermore, the controller may be configured to regulate the mechanism to cool the fluid circulated through the heat exchanger according to the sensed temperature of the fluid.

The above features and advantages and other features and advantages of the present invention are readily apparent from the following detailed description of the best modes for carrying out the invention when taken in connection with the accompanying drawings.

DETAILED DESCRIPTION

Figure 1:
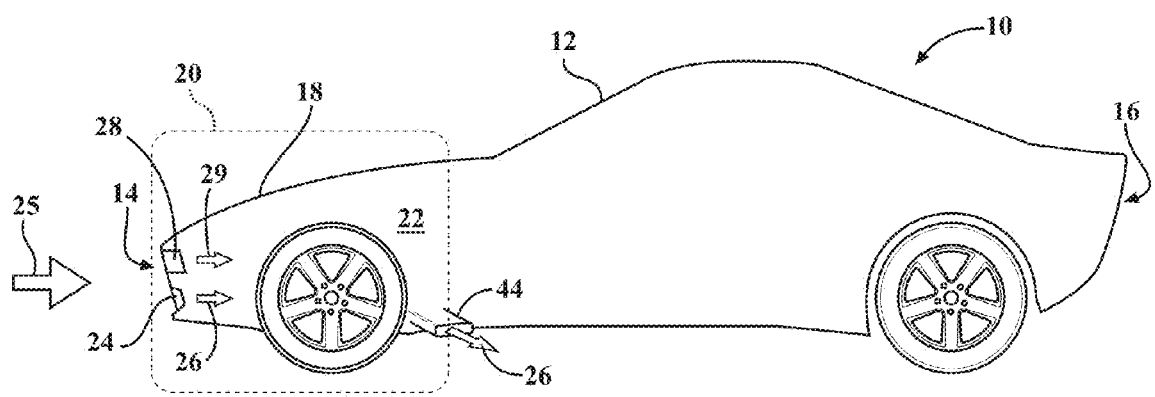
FIG. 1 is a schematic side view of a vehicle having a first, un-shuttered grille opening and a second, shuttered grille opening, each grille opening disposed at an entrance to an under-hood compartment.

Referring to the drawings, wherein like reference numbers refer to like components, FIG. 1 shows a vehicle 10. The vehicle 10 includes a vehicle body 12 which is characterized by a first end 14 and a second end 16. The vehicle 10 also includes a hood 18 configured to cover a portion 20 of the first end 14 to thereby define a covered compartment which is an under-hood compartment 22.

A first grille opening 24 and a second grille opening 28 are at least partially defined by the vehicle body 12. The first grille opening 24 is disposed at the first end 14 of the vehicle body 12 and is configured to admit a first portion 26 of airflow 25 to enter the under-hood compartment 22 from the ambient. The second grille opening 28 is also disposed at the first end 14 of the vehicle body 12 and is configured to admit a second portion 29 of the airflow 25 to enter the under-hood compartment 22 from the ambient. Generally, openings that are located at the front of a vehicle, such as the first and second grille openings 24, 28, as well as various protruding features on the surface of the vehicle body tend to impact the vehicle's aerodynamic signature.

Figure 2:
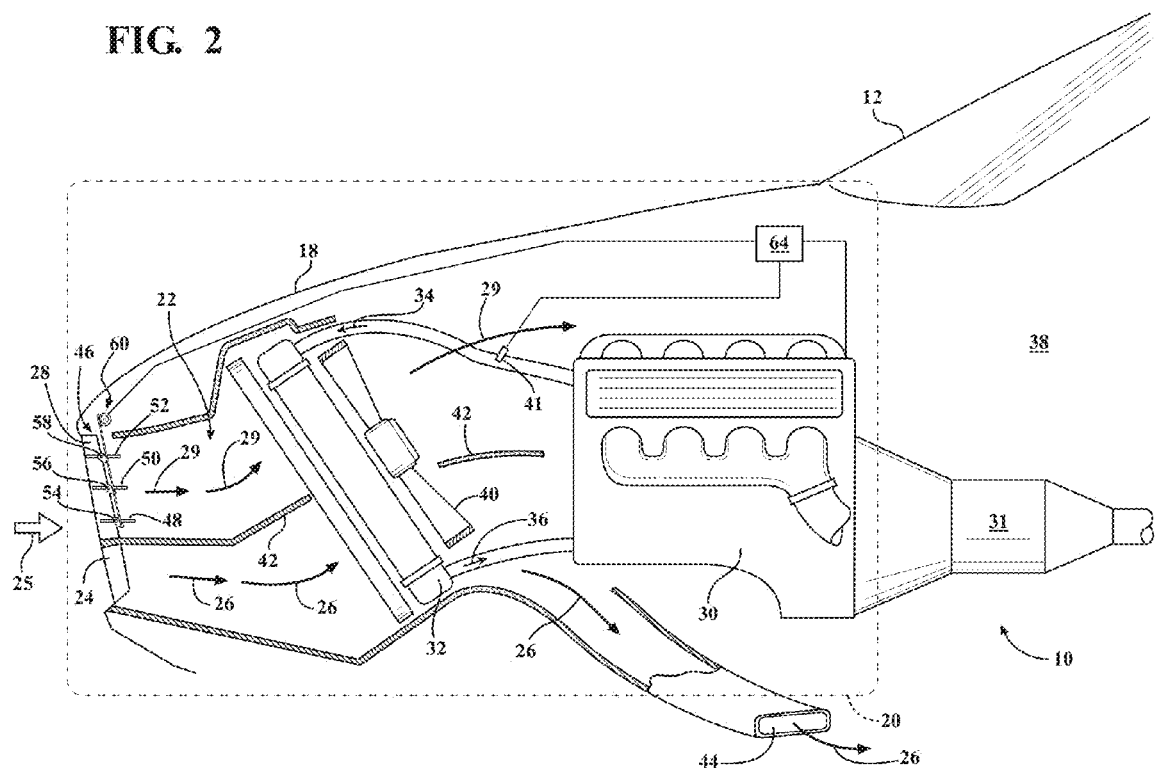
FIG. 2 is a cross-sectional partial side view of the vehicle shown in FIG. 1, the second grille opening depicted in a fully opened state.
Figure 3:
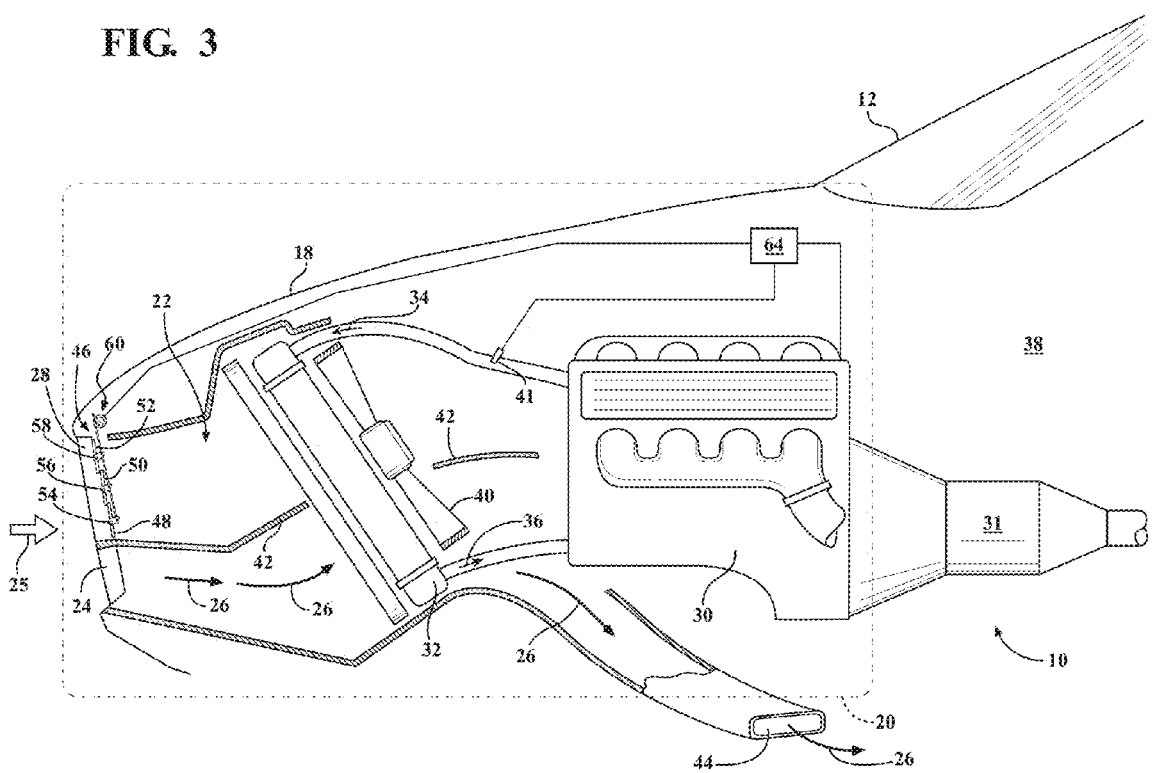
FIG. 3 is a cross-sectional partial side view of the vehicle shown in FIG. 1, the second opening depicted in a fully closed state.

As shown in FIGS. 2-3, the vehicle 10 also includes an internal combustion engine 30 configured to propel the vehicle and an air-to-fluid heat exchanger 32, i.e., a radiator, for cooling the engine 30. The engine 30 is typically part of a vehicle powertrain that also includes a transmission 31, as shown. Although a single heat exchanger 32 is shown, nothing precludes any number of heat exchangers being arranged side by side or in a series for cooling a number of vehicle systems or components, such as the transmission 31. Both the engine 30 and heat exchanger 32 are mounted in the under-hood compartment 22 where they can be accessed by one or both of the first and second airflow portions 26, 29. As shown, after being admitted through the first and second grille openings 24, 28, the first and second airflow portions 26, 29 are passed through the heat exchanger 32.

By passing through the heat exchanger 32, the first and second airflow portions 26, 29 facilitate cooling of a circulating fluid, such as water or a specially formulated coolant, shown by arrows 34 and 36, that is used to carry heat away from the engine 30 to the heat exchanger. Typically, the coolant is continuously circulated by a fluid pump (not shown) between the engine 30 and the heat exchanger 32. Accordingly, the arrow 34 represents the high-temperature coolant exiting the engine and the arrow 36 represents the reduced-temperature coolant exiting the heat exchanger. The transmission 31 is typically lubricated by oil that, in certain highly stressed vehicle applications, may require auxiliary cooling. In such applications, the transmission oil may also be passed through the heat exchanger 32 to achieve the desired cooling.

As shown in FIGS. 2-3, the heat exchanger 32 is positioned behind the first and second grille openings 24, 28 that are each covered by a mesh (not shown) for protection of the heat exchanger from various road- and air-borne debris. Although the heat exchanger 32 is shown as being positioned at the front of the vehicle 10, i.e., proximately to the first end 14, the heat exchanger may also be positioned in a different location, such as behind a passenger compartment 38. Positioning the heat exchanger 32 behind the passenger compartment 38 may be advantageous, if, for example, the vehicle has a rear or a mid-engine configuration. A fan 40 may be positioned behind the heat exchanger 32 for drawing the first and second airflow portions 26, 29 through the heat exchanger 32. The fan 40 may be driven either electrically by an electric motor (not shown) or mechanically by the engine 30. Accordingly, the fan 40 may be capable of being selectively turned on and off based on the cooling needs of the engine 30.

Depending on the road speed of the vehicle 10, the fan 40 is adapted to either generate or enhance the airflow 25 from the ambient through the first and second grille openings 24, 28 and on through the heat exchanger 32. Thus generated or enhanced through the action of the fan 40, the first and second airflow portions 26, 29 are passed through the heat exchanger 32 to remove heat from the high-temperature coolant 34 before the reduced-temperature coolant 36 is returned to the engine 30. The vehicle 10 additionally includes a coolant sensor 41 configured to sense a temperature of the high-temperature coolant 34 as the coolant exits the engine 30. Accordingly, the first and second portions 26, 29 of the airflow 25 are employed for cooling the engine 30, as well as other various components housed within the under-hood compartment 22.

As shown in FIGS. 2-3, after the first and second airflow portions 26, 29 enter the under-hood compartment 22 through the first and second grille openings 24, 28, the first and second airflow portions may be maintained as separate flows by a partition 42. Each of the first and second airflow portions 26, 29 is passed through the heat exchanger 32. Additionally, the partition 42 may be configured to extend past the fan 40, as shown in FIGS. 2-3, to maintain the first airflow portion 26 separate from the second airflow portion 29 after the respective airflow portions have passed through the heat exchanger 32. Following the first and second airflow portions 26, 29 being passed through the heat exchanger 32, the first airflow portion 26 may be directed to and exhausted to the ambient from within the under-hood compartment 22 via a vent opening 44. The vent opening 44 is at least partially defined by the vehicle body 12, and, as such, may be incorporated directly into the vehicle body or be shaped as a duct that is mounted thereto. The vent opening 44 may be positioned behind the heat exchanger 32 toward the second end 16, below the engine 30 or the transmission 31, or on the sides of the vehicle body 12. Although not specifically shown, the vent opening 44 may also be positioned on the hood 18, toward the second end 16 above the engine 30.

Any of the envisioned arrangements of the vent opening 44 are intended to exhaust the first airflow portion 26 from the under-hood compartment 22 after the first airflow portion has passed through the heat exchanger 32. Without being exhausted through the vent opening 44, the first airflow portion 26 would be trapped inside the under-hood compartment 22, thus pressurizing the under-hood compartment and contributing to an increase in aerodynamic drag of the vehicle 10 at elevated vehicle speeds. Accordingly, the vent opening 44 is positioned and sized to permit the first airflow portion 26 to exit the under-hood compartment 22 and return to the ambient instead of remaining under-hood.

FIGS. 2-3 also depict a rotatable or selectable position shutter assembly 46. The shutter assembly 46 is disposed in the second grille opening 28 and is adapted to regulate the second airflow portion 29 entering the under-hood compartment 22. As shown, the shutter assembly 46 includes a plurality of louvers, herein shown as having three individual louver elements 48, 50, and 52, but the number of louvers may be either fewer or greater. The shutter assembly 46 is configured to control the size of the second grille opening 28 such that a flow rate of the second airflow portion 29 entering the under-hood compartment 22 is adjusted or varied. Each louver element 48, 50, and 52 is configured to rotate about a respective pivot axis 54, 56, and 58 during operation of the shutter assembly 46. Such rotation of the louvers 48, 50, and 52 effectively controls the size of the second grille opening 28 and the flow rate of the second airflow portion 29 entering the under-hood compartment 22.

The shutter assembly 46 is adapted to operate between and inclusive of a fully closed position or state, through an intermediate or partially closed position, and to a fully opened position. Accordingly, when the louver elements 48, 50, and 52 are in the fully opened position (as shown in FIG. 2), the second airflow portion 29 is unrestricted to enter the under-hood compartment 22. Additionally, when the louver elements 48, 50, and 52 are in the partially opened position, which is not shown but would be appreciated by those skilled in the art, the second airflow portion 29 may enter the under-hood compartment 22, but its passage through the second grille opening 28 is restricted. Furthermore, when the louver elements 48, 50, and 52 are in the fully closed position (as shown in FIG. 3), the second airflow portion 29 is substantially blocked from entering the under-hood compartment 22.

The shutter assembly 46 also includes a mechanism 60 configured to adjust the louver elements 48, 50, and 52, which thereby selects and locks a desired position of the shutter assembly between and inclusive of fully opened and fully closed. The mechanism 60 is configured to cause the louvers 48-52 to rotate in tandem, i.e., substantially in unison, and permitting the shutter assembly 46 to adopt any of the available positions. The mechanism 60 may be adapted to select discrete intermediate position(s) of the louvers 48-52, or to infinitely vary the position of the louvers between and inclusive of the fully opened and fully closed. The mechanism 60 acts to select the desired position for the shutter assembly 46 when the mechanism is activated by any external means, such as an electric motor (not shown).

As shown in FIGS. 2-3, the vehicle 10 also includes a controller 64, which may be an engine controller or a separate control unit, configured to operate the mechanism 60 for selecting the desired position of the shutter assembly 46. The controller 64 may also be configured to operate the fan 40, if the fan is electrically driven, and a thermostat (not shown) that is configured to regulate the circulation of coolant, as understood by those skilled in the art. The controller 64 is programmed to operate the mechanism 60 in response to variation in load or stress on the engine 30 and according to the temperature of the coolant sensed by the sensor 41. The temperature of the high-temperature coolant 34 is increased due to the heat produced by the engine 30 under load. As known by those skilled in the art, having the engine 30 propel the vehicle 10 up a hill and/or pull a trailer are the types of increased stress operating conditions that drive up the internal temperature of the engine. In turn, an increase in the engine's internal temperature necessitates more rapid engine cooling for desired performance and reliability.

When the fully closed position for the shutter assembly 46 is selected by the controller 64, only the first airflow portion 26 is admitted into the under-hood compartment 22, thus providing a base airflow through the under-hood compartment. Accordingly, the fully closed position for the shutter assembly 46 achieves a base level of cooling for the high-temperature coolant 34 inside the heat exchanger 32. When the fully opened position for the shutter assembly 46 is selected by the controller 64, the second airflow portion 29 is admitted into the under-hood compartment 22. The entry of the second airflow portion 29 into the under-hood compartment 22 serves to increase the total amount of airflow to the heat exchanger 32 from the base level to a maximum flow permitted by the under-hood compartment and the size and power of the fan 40. Accordingly, the fully opened position for the shutter assembly 46 achieves an increased level of cooling for the high-temperature coolant 34 inside the heat exchanger 32, as may be required by the cooling needs of the engine 30. An intermediate, partially opened position for the shutter assembly 46 may also be selected by the controller 64 in response to a particular cooling need of the engine 30. Such a partially opened position for the shutter assembly 46 may generate a commensurate intermediate flow rate of the second airflow portion 29 through the under-hood compartment 22.

Overall, when increased load operating conditions of the vehicle 10 so require, the controller 64 operates the shutter assembly 46 to control the size of the second grille opening 28 such that the second airflow portion 29 adds to the cooling effect provided by the first airflow portion 26. When the engine 10 generates a first predetermined amount of heat during base engine operation, the first grille opening 24 is configured to provide sufficient cooling to the engine. On the other hand, the second grille opening 28 being controlled by the shutter assembly 46 and the exposed first grille opening 24 are together configured to provide sufficient cooling to the engine 10 when the engine generates a second predetermined amount of heat during increased stress operation. As such, the first grille opening 24 is sized to admit the first airflow portion 26 that is sufficient to effectively cool the engine 30, as well as the transmission 31 when the vehicle 10 is traversing relatively level ground at elevated speed. Accordingly, although the size of the second grill opening 28 is controlled via the shutter assembly 46, the first grille opening 24 is continuously exposed to provide the base airflow into the under-hood compartment 22 in the form of the first airflow portion 26.

As mentioned above, the first grille opening 24 is sized such that the first airflow portion 26 admitted therethrough is sufficient to cool the engine 30 and the transmission 31 when the vehicle 10 is subjected to steady state, low load operation. At elevated vehicle speeds the aerodynamic effect of the second airflow portion 29 is relatively small, because at such speeds the shutter assembly 46 is frequently either partially or fully closed, thus reducing the second airflow portion 29 to a minimal or negligible amount. As such, although the first airflow portion 26 is exhausted from the under-hood compartment 22 via the vent opening 44, the second airflow portion 29 may be maintained within the under-hood compartment without incurring a significant aerodynamic penalty.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
    a vehicle body having a first end and a second end, and at least partially defining a first grille opening, a second grille opening, and a vent opening;
    a hood configured to cover a portion of the first end of the body to thereby define an under-hood compartment;
    an internal combustion engine and a heat exchanger, each housed in the under-hood compartment, and wherein the engine is cooled by a fluid circulating through the heat exchanger;
    a selectable position shutter assembly disposed at the second grille opening; and
    a partition arranged in the under-hood compartment;
    wherein:
        the first grille opening and the second grille opening are disposed at the first end of the vehicle body and configured to admit a first portion of an airflow and a second portion of the airflow, respectively, to the under-hood compartment from the ambient;
        the shutter assembly is configured to control the second portion of the airflow admitted to the under-hood compartment;
        the partition is configured to maintain the first portion of the airflow separate from the second portion of the airflow;
        the first portion of airflow is passed through the heat exchanger to cool the fluid after the fluid is passed through the engine; and
        the vent opening is configured to exhaust at least a fraction of the first portion of the airflow from the under-hood compartment to the ambient.

2. The vehicle of claim 1, wherein each of the first and second portions of the airflow is passed through the heat exchanger, wherein the partition maintains the first airflow portion separate from the second airflow portion after the respective airflow portions have passed through the heat exchanger, and wherein the first portion of the airflow is directed to the vent opening after having been passed through the heat exchanger.

3. The vehicle of claim 1, wherein:
    the internal combustion engine generates a first predetermined amount of heat during base engine operation and up to a second predetermined amount of heat during increased stress engine operation;
    the first grille opening is configured to provide sufficient cooling to the engine during the base engine operation; and
    the second grille opening together with the first grille opening are configured to provide sufficient cooling to the engine during the increased stress engine operation.

4. The vehicle of claim 1, wherein the shutter assembly includes a mechanism configured to select the position of the shutter assembly between and inclusive of fully opened and fully closed.

5. The vehicle of claim 4, wherein the shutter assembly includes at least one louver and the mechanism is configured to rotate the at least one louver to selectively cover and uncover the vent opening.

6. The vehicle of claim 4, further comprising a controller configured to regulate the mechanism.

7. The vehicle of claim 6, wherein the controller is configured to regulate the mechanism according to a load on the engine.

8. The vehicle of claim 6, wherein:
the engine includes a sensor configured to detect a temperature of the fluid and communicate the temperature to the controller; and
the controller is configured to regulate the mechanism to cool the fluid circulated through the heat exchanger according to the sensed temperature of the fluid.

9. A system for controlling airflow through an under-hood compartment of a vehicle body that houses an internal combustion engine and a heat exchanger, the system comprising:
a first grille opening, a second grille opening, and a vent opening, each at least partially defined by the vehicle body;
a selectable position shutter assembly disposed at the second grille opening; and
a partition arranged in the under-hood compartment;
wherein:
the first grille opening and the second grille opening are disposed at the first end of the vehicle body and configured to admit a first portion of an airflow and a second portion of the airflow, respectively, to the under-hood compartment from the ambient;
the shutter assembly is configured to control the second portion of the airflow admitted to the under-hood compartment;
the partition is configured to maintain the first portion of the airflow separate from the second portion of the airflow;
the engine is cooled by a fluid circulating through the heat exchanger;
the first portion of airflow is passed through the heat exchanger to cool the fluid after the fluid is passed through the engine; and
the vent opening is configured to exhaust at least a fraction of the first portion of the airflow from the under-hood compartment to the ambient.

10. The system of claim 9, wherein each of the first and second portions of the airflow is passed through the heat exchanger, wherein the partition maintains the first airflow portion separate from the second airflow portion after the respective airflow portions have passed through the heat exchanger, and wherein the first portion of the airflow is directed to the vent opening after having been passed through the heat exchanger.

11. The system of claim 9, wherein:
the internal combustion engine generates a first predetermined amount of heat during base engine operation and up to a second predetermined amount of heat during increased stress engine operation;
the first grille opening is configured to provide sufficient cooling to the engine during the base engine operation; and
the second grille opening together with the first grille opening are configured to provide sufficient cooling to the engine during the increased stress engine operation.

12. The system of claim 9, wherein the shutter assembly includes a mechanism configured to select the position of the shutter assembly between and inclusive of fully opened and fully closed.

13. The system of claim 12, wherein the shutter assembly includes at least one louver and the mechanism is configured to rotate the at least one louver to selectively cover and uncover the vent opening.

14. The system of claim 12, further comprising a controller configured to regulate the mechanism.

15. The system of claim 14, wherein the controller is configured to regulate the mechanism according to a load on the engine.

16. The vehicle of claim 14, wherein:
the engine includes a sensor configured to detect a temperature of the fluid and communicate the temperature to the controller; and
the controller is configured to regulate the mechanism to cool the fluid circulated through the heat exchanger according to the sensed temperature of the fluid.

* * * * *